(12) United States Patent
Maruyama et al.

(10) Patent No.: US 12,441,412 B2
(45) Date of Patent: Oct. 14, 2025

(54) LOWER VEHICLE-BODY STRUCTURE

(71) Applicant: HONDA MOTOR CO., LTD., Tokyo (JP)

(72) Inventors: Atsushi Maruyama, Tokyo (JP); Kota Fujisawa, Tokyo (JP); Yuki Muramatsu, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 421 days.

(21) Appl. No.: 18/084,700

(22) Filed: Dec. 20, 2022

(65) Prior Publication Data
US 2023/0202581 A1    Jun. 29, 2023

(30) Foreign Application Priority Data
Dec. 28, 2021    (JP) .................................. 2021-213757

(51) Int. Cl.
| | | |
|---|---|---|
| *B62D 25/20* | (2006.01) | |
| *B60N 2/015* | (2006.01) | |
| *B62D 21/03* | (2006.01) | |

(52) U.S. Cl.
CPC ......... *B62D 25/2036* (2013.01); *B60N 2/015* (2013.01); *B62D 21/03* (2013.01)

(58) Field of Classification Search
CPC ........ B60N 2/015; B62D 21/03; B62D 25/20; B62D 25/2036
See application file for complete search history.

(56) References Cited

U.S. PATENT DOCUMENTS

| | | | | |
|---|---|---|---|---|
| 9,764,775 | B2* | 9/2017 | Daigaku | B62D 25/2036 |
| 9,873,457 | B2* | 1/2018 | Onishi | B62D 21/157 |
| 10,124,834 | B2 | 11/2018 | Saeki et al. | |
| 11,292,526 | B2* | 4/2022 | Ebisumoto | B62D 21/02 |
| 2017/0015360 | A1* | 1/2017 | Onishi | B62D 21/157 |
| 2017/0106906 | A1* | 4/2017 | Onishi | B62D 25/2036 |
| 2017/0144711 | A1* | 5/2017 | Daigaku | B62D 21/02 |
| 2023/0202578 | A1* | 6/2023 | Maruyama | B62D 25/2009 296/193.07 |
| 2023/0311715 | A1* | 10/2023 | Muramatsu | B62D 25/2036 296/193.07 |
| 2023/0312017 | A1* | 10/2023 | Muramatsu | B62D 25/025 296/193.07 |
| 2024/0198863 | A1* | 6/2024 | Hirota | B62D 25/2036 |

FOREIGN PATENT DOCUMENTS

JP    6311679 B2    4/2018

* cited by examiner

*Primary Examiner* — Lori Lyjak
(74) *Attorney, Agent, or Firm* — Rankin, Hill & Clark LLP

(57) ABSTRACT

A lower vehicle-body structure includes: a floor cross member coupling a side sill disposed on an outer side in a vehicle width direction of a vehicle body to a floor tunnel disposed in a center in the vehicle width direction of the vehicle body; seat brackets disposed to have the floor cross member therebetween in a vehicle front-rear direction at both ends in the vehicle width direction of the floor cross member, and coupled to the side sill and the floor tunnel, respectively; and a floor frame extending in the vehicle front-rear direction and disposed on a floor panel. At least portions of the seat brackets are disposed at positions to overlap with the floor frame in a planar view.

9 Claims, 10 Drawing Sheets

LOWER VEHICLE-BODY STRUCTURE

CROSS-REFERENCE TO RELATED APPLICATION

The present application claims the benefit of priority to Japanese Patent Application No. 2021-213757 filed on Dec. 28, 2021, the disclosures of all of which are hereby incorporated by reference in their entireties.

TECHNICAL FIELD

Field of the Invention

The present invention relates to a lower vehicle-body structure of a vehicle such as an automobile.

Related Art

Japanese Patent No. 6311679 (referred to as Patent Document 1 hereinbelow) discloses a lower vehicle-body structure, having an H-shaped structure in a planar view and including a floor cross member disposed along a vehicle width direction between a side sill and a floor tunnel.

Seat attachments are respectively provided on a front side and a rear side in a vehicle front-rear direction of the floor cross member. In Patent document 1, with the H-shaped seat support structure, a cross-sectional area of the floor cross member can be increased, without affecting legroom for occupants, to suitably react to an inputted side collision load.

SUMMARY OF THE INVENTION

However, the H-shaped seat support structure disclosed in Patent Document 1 has the seat attachments located at positions away in the front-rear direction from the floor cross member, making it difficult to sufficiently transmit a load inputted from a seat (seat load) to the floor cross member. Therefore, a floor panel having low rigidity is required to support the seat load.

This makes it difficult for the H-shaped seat support structure disclosed in Patent Document 1 to sufficiently support the seat load, to have a risk of reducing ride comfort of occupants.

In addition, the lower-vehicle body is required to be reduced in weight and improve rigidity.

The present invention has been devised in view of above-described points and is intended to provide a lower vehicle-body structure to allow for reducing a lower vehicle-body in weight and improving rigidity of the lower-vehicle body.

To achieve this objective, the present invention provides a lower vehicle-body structure including: a floor cross member coupling a side sill disposed on an outer side in a vehicle width direction of a vehicle body to a floor tunnel disposed in a center in the vehicle width direction of the vehicle body; seat brackets disposed to have the floor cross member therebetween in a vehicle front-rear direction at both ends in the vehicle width direction of the floor cross member, and coupled to the side sill and the floor tunnel, respectively; and a floor frame extending in the vehicle front-rear direction and disposed on a floor panel, wherein at least portions of the seat brackets are disposed at positions to overlap with the floor frame in a planar view.

The present invention provides a lower vehicle-body structure to allow for reducing a lower vehicle-body in weight and improving rigidity of the lower-vehicle body.

DESCRIPTION OF THE EMBODIMENTS

Next, a description is given in detail of an embodiment of the present invention, with reference to the drawings as appropriate. In each drawing, "front-rear" refers to a vehicle front-rear direction, "right-left" refers to a vehicle width direction (right-left direction), and "up-down" refers to a vehicle up-down direction (vertically up-down direction).

Figure 1:
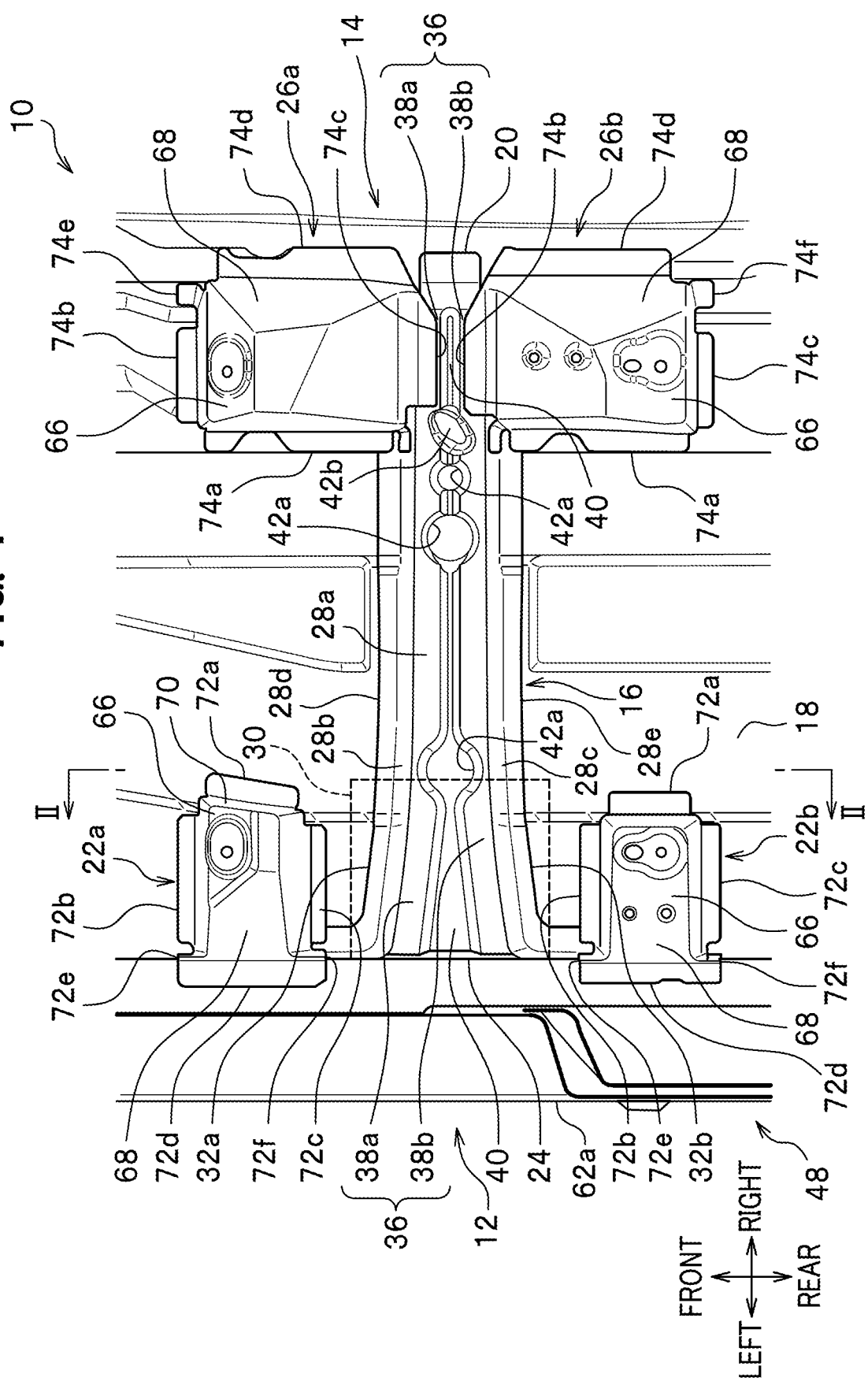
FIG. 1 is a plan view of a front portion of a vehicle applied with a lower vehicle-body structure according to an embodiment of the present invention, as viewed from above.

As shown in FIG. 1, a vehicle 10 applied with a lower vehicle-body structure according to the embodiment of the present invention includes a side sill 12 disposed on an outer side in the vehicle width direction thereof, a floor tunnel 14 disposed in the center of a vehicle body, a floor cross member 16 disposed along the vehicle width direction and coupling the side sill 12 to the floor tunnel 14, and a floor panel 18 disposed between the side sill 12 and the floor tunnel 14. Note that FIG. 1 only shows a left portion of the vehicle body in a planar view, and a right portion of the vehicle body, which is disposed in line symmetry with the left portion of the vehicle body, is omitted.

Figure 2:
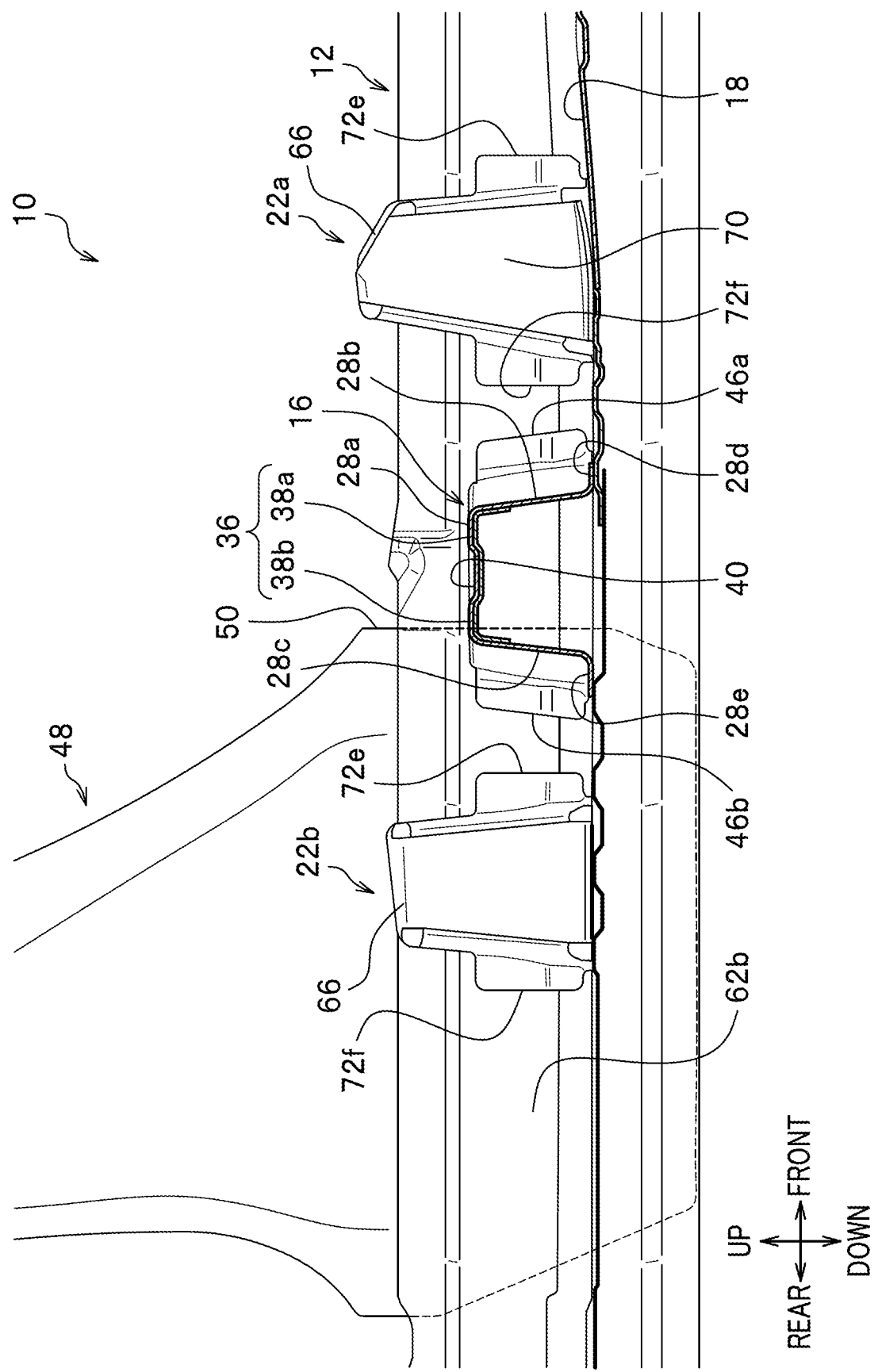
FIG. 2 is a vertical cross-sectional view, taken along a line II-II in FIG. 1.

As shown in FIG. 2, the floor cross member 16 has a substantially hat-shape in axial cross section. In addition, the floor cross member 16 has an upper wall 28*a* to form an upper surface thereof, a front wall 28*b* which is bent downward from a front end in the vehicle front-rear direction of the upper wall 28*a* and extends along the vehicle width direction, a rear wall 28*c* which is bent downward from a rear end in the vehicle front-rear direction of the upper wall 28*a* and extends along the vehicle width direction, a front flange 28*d* which is bent forward in the vehicle front-rear direction from a lower end of the front wall 28*b*, and a rear flange 28*e* which is bent rearward in the vehicle front-rear direction from a lower end of the rear wall 28*c*. The front flange 28*d* and the rear flange 28*e* are each joined and fixed to an upper surface of the floor panel 18 by spot welding, for example, or the like.

Further, as shown in FIG. 1, an outer end 24 in the vehicle width direction of the floor cross member 16 is provided with a widened portion 30 having a wider width in the vehicle front and rear directions toward the side sill 12 (see a portion enclosed by dashed lines in FIG. 1). The widened portion 30 has a front widened portion 32a which is widened forward in the vehicle front-rear direction and a rear widened portion 32b which is widened rearward in the vehicle front-rear direction, at the outer end 24 in the vehicle-width direction of the floor cross member 16.

Figure 7:
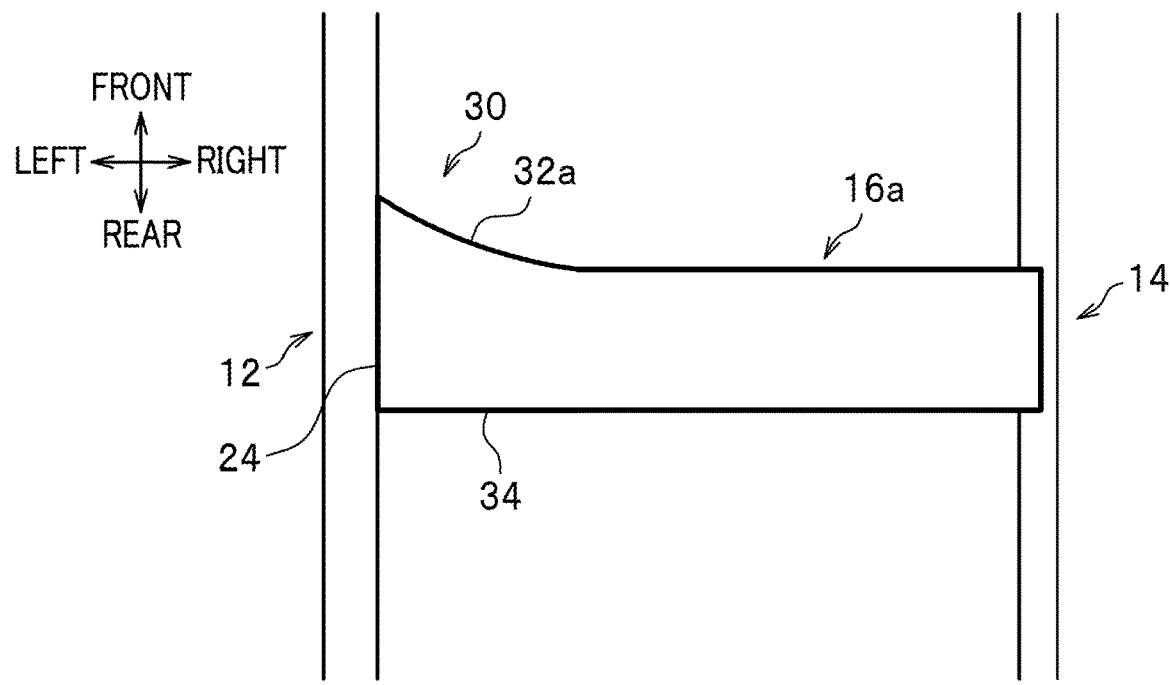
FIG. 7 is a schematic diagram of a modification of a widened portion of a floor cross member.
Figure 8:
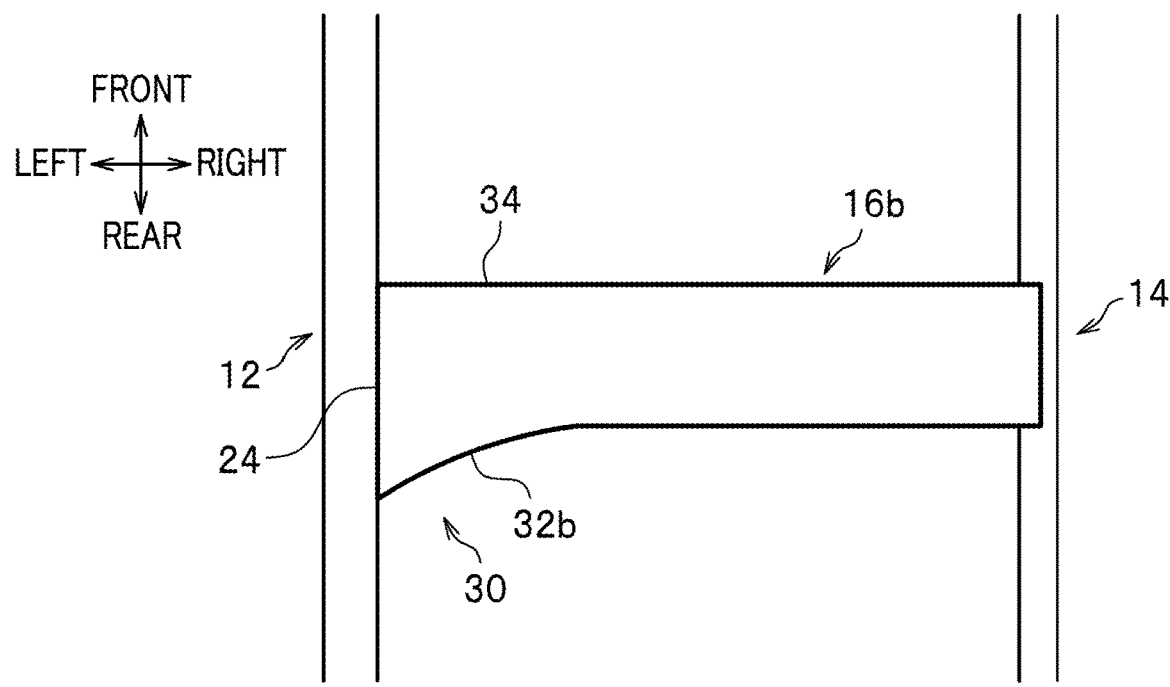
FIG. 8 is a schematic diagram of another modification of the widened portion of the floor cross member.

The present embodiment has the widened portion 30 including both the front widened portion 32a and the rear widened portion 32b, but is not limited thereto. For example, as shown in a modification in FIG. 7, the widened portion 30 may only have the front widened portion 32a which is widened forward in the vehicle front-rear direction at the outer end 24 in the vehicle width direction of a floor cross member 16a, and a rear end thereof may have a flat portion 34 which is not widened and is continuous to the rest of the floor cross member 16a. Further, as shown in a floor cross member 16b of another modification in FIG. 8, the widened portion 30 may only have the rear widened portion 32b which is widened rearward in the vehicle front-rear direction, and a front end thereof may have the flat portion 34 which is not widened and is continuous to the rest of the floor cross member 16b. Thus, the widened portion 30 includes one having at least one of the front and rear widened portions.

As shown in FIGS. 1 and 2, the upper wall 28a of the floor cross member 16 is provided, on an upper surface thereof, with a bead 36 which bulges upward and extends along the vehicle width direction. The bead 36 has a front bead 38a extending along the front wall 28b and a rear bead 38b extending along the rear wall 28c. The front bead 38a and the rear bead 38b extend beyond the widened portion 30, which is positioned on the outer side in the vehicle width direction, up to positions (in the vicinity of the side sill 12) of first seat brackets 22a and 22b, which are disposed on an outer side in the vehicle width direction with respect to the widened portion 30.

A recess 40 recessed toward the floor panel 18 (downward) is formed between the front bead 38a and the rear bead 38b. The recess 40 extends along a longitudinal direction (vehicle width direction) of the floor cross member 16 and is configured to increase in width in the vehicle front-rear direction at the widened portion 30. Therefore, the width in the vehicle front-rear direction of the recess 40 closest to the side sill 12 is the largest. The recess 40 is formed, at middle portions thereof, with a plurality of circular recesses 42a having a large, middle, and small inner diameters, respectively, and a single oval recess 42b, for example. Note that the width of the recess 40, excluding the recess 40 formed at the widened portion 30, the circular recesses 42a, and the oval recess 42b, is formed substantially constant. Note that, in the present embodiment has the recess 40 formed between the front bead 38a and the rear bead 38b as an example, but is not limited thereto and a convex portion which bulges upward may be formed in place of the recess 40.

Figure 9:
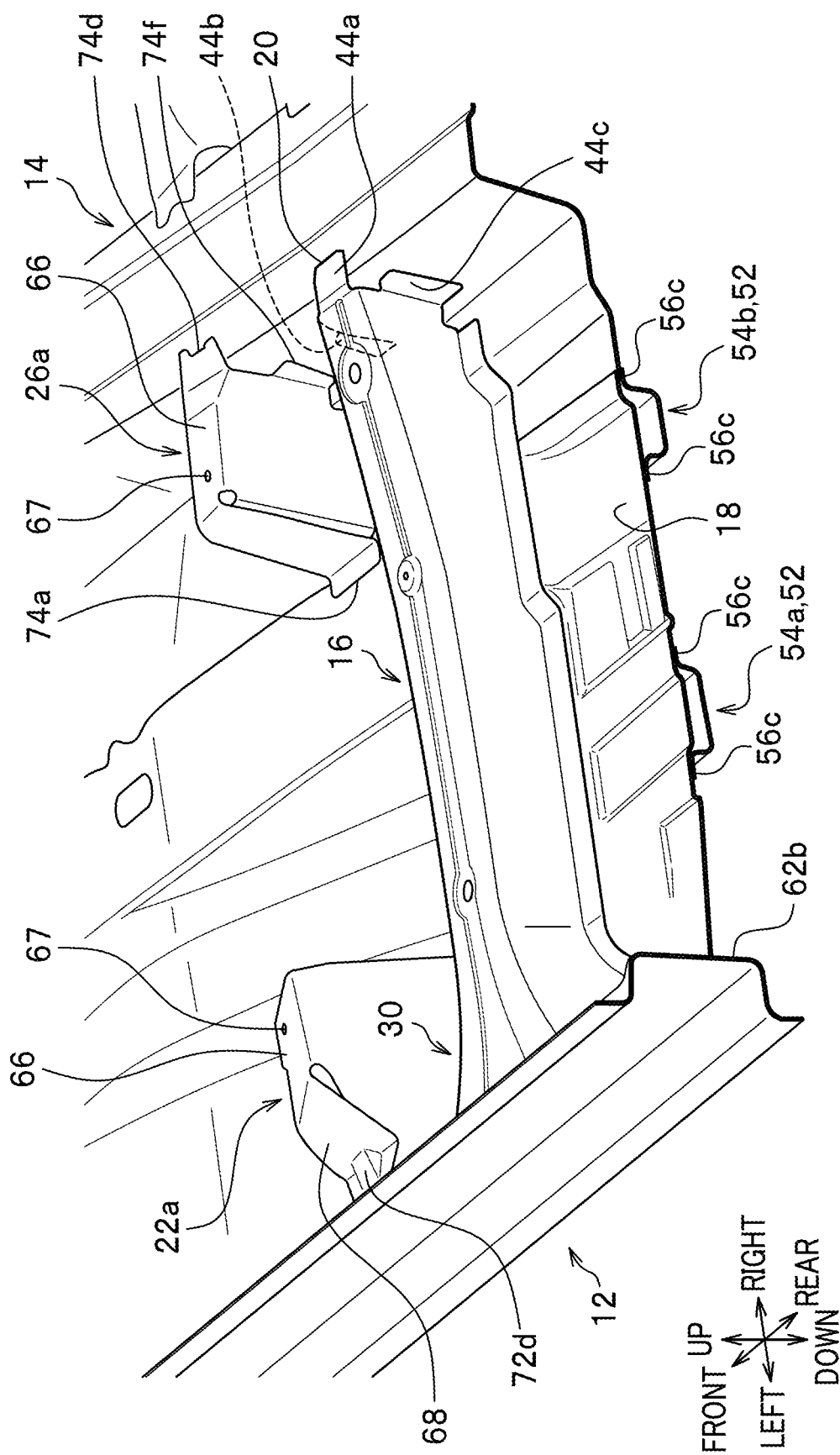
FIG. 9 is a partially broken perspective view of an inner end in a vehicle width direction of the floor cross member being coupled to a floor tunnel.

An inner end 20 in the vehicle width direction of the floor cross member 16 is coupled to the floor tunnel 14. That is, as shown in FIG. 9, the inner end 20 in the vehicle width direction of the floor cross member 16 has an upper flange 44a, which is joined to an upper surface of the floor tunnel 14, and a front flange 44b and a rear flange 44c, which are joined to a side surface of the floor tunnel 14.

In addition, second seat brackets 26a and 26b coupled to the floor tunnel 14 are disposed on both sides in the vehicle front-rear direction of the floor cross member 16, at an end (a portion in the vicinity of the inner end 20 in the vehicle width direction), closer to the floor tunnel 14, of the floor cross member 16 (see FIG. 1). The recess 40 formed in the upper surface of the floor cross member 16 extends up to a position to overlap in the vehicle width direction with the second seat brackets 26a and 26b (see FIG. 1).

As shown in FIG. 1, the pair of first seat brackets 22a and 22b are respectively disposed at the outer end 24 in the vehicle width direction of the floor cross member 16, adjacent to the side sill 12, so as to hold the floor cross member 16 therebetween in the vehicle front-rear direction. In addition, the pair of second seat brackets 26a and 26b are respectively disposed at the inner end 20 in the vehicle width direction of the floor cross member 16, adjacent to the floor tunnel 14, so as to hold the floor cross member 16 therebetween in the vehicle front-rear direction.

Further, the outer end 24 in the vehicle width direction of the floor cross member 16 has a front flange 46a and a rear flange 46b (see FIG. 2) which are joined to the side sill 12 (inner side sill 62b). In the vehicle front-rear direction, the rear flange 46b is joined (coupled) to the side sill 12 at a position to overlap with a front end 50 in the vehicle front-rear direction of a center pillar (pillar) 48, and the front flange 46a is joined (coupled) to the side sill 12 at a forward position in the vehicle front-rear direction with respect to the center pillar 48.

Figure 3:
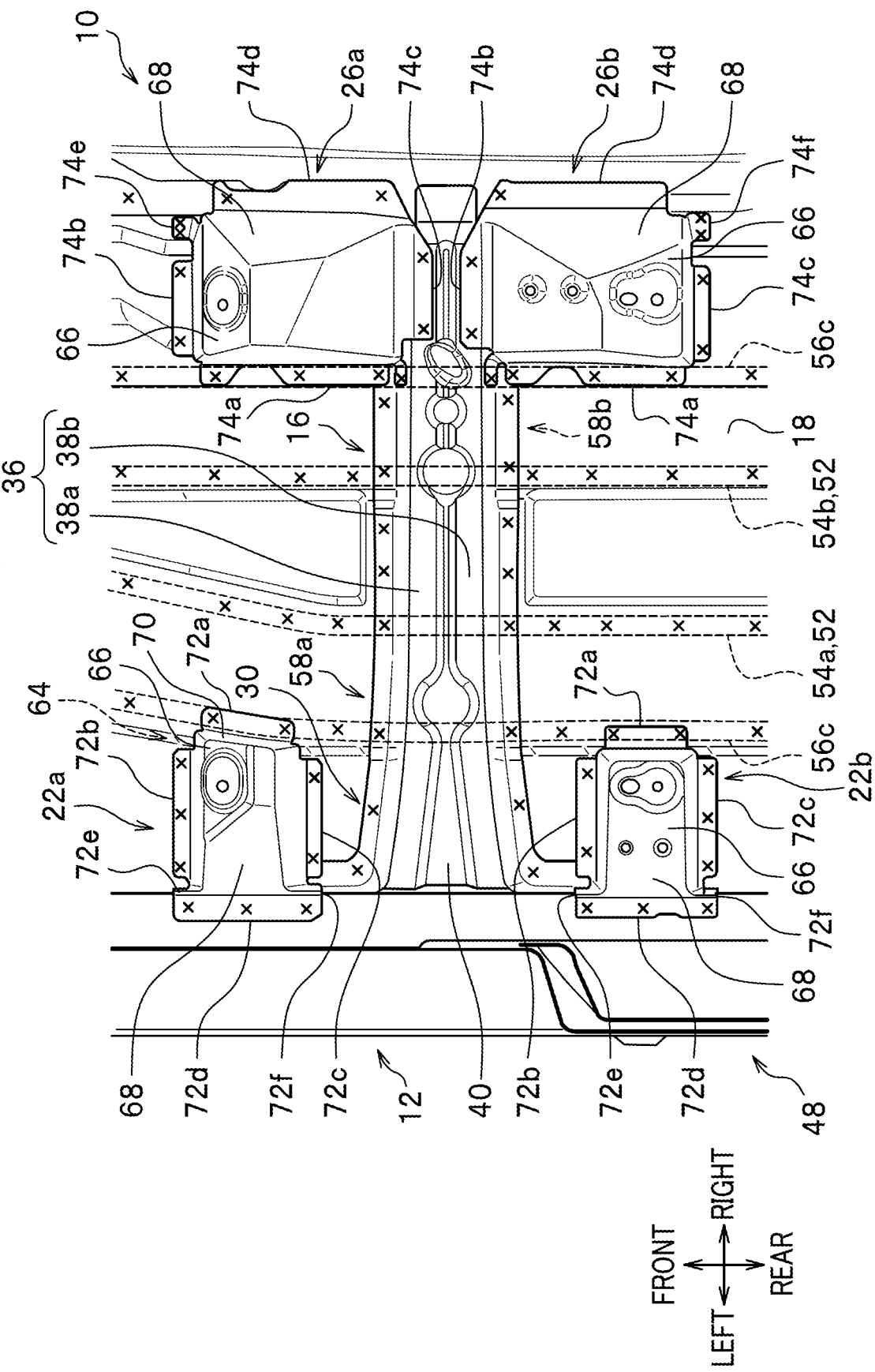
FIG. 3 is a partially transparent plan view of the front portion of the vehicle shown in FIG. 1.
Figure 4:
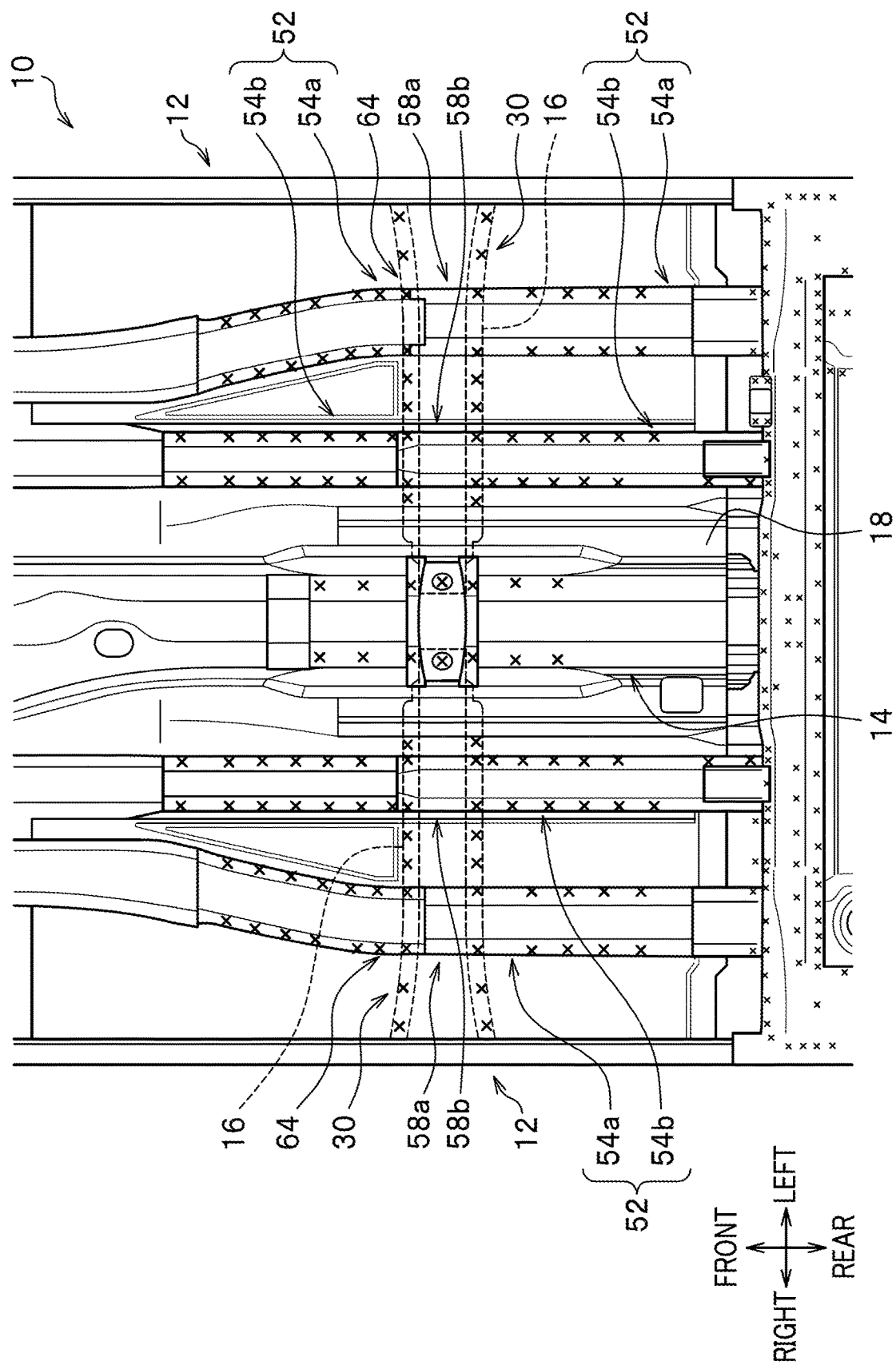
FIG. 4 is a partially transparent bottom view of the front portion of the vehicle shown in FIG. 1, as viewed from bottom.
Figure 5:
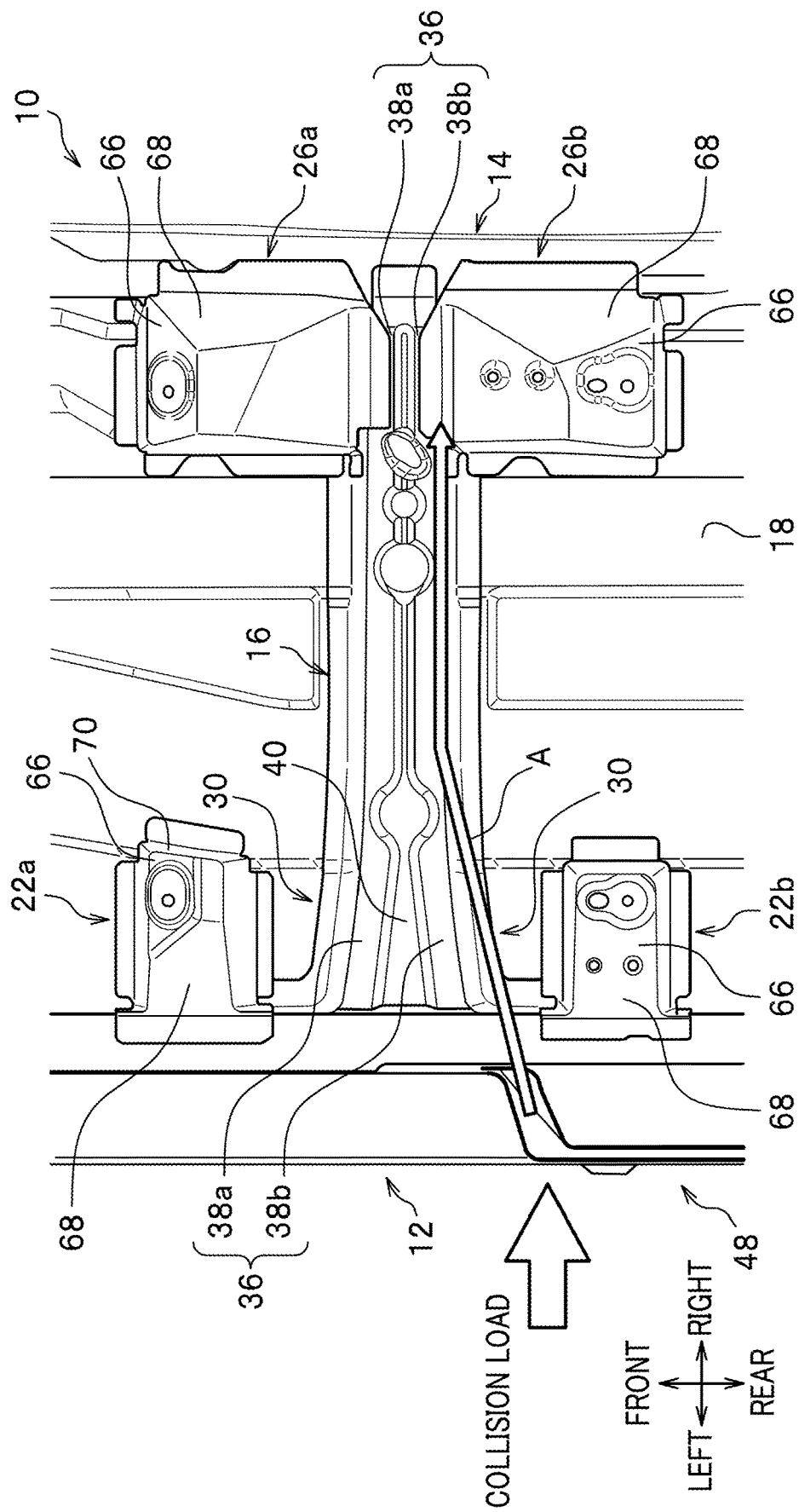
FIG. 5 illustrates a side collision load offset in a vehicle front-rear direction being transmitted.

As shown in FIGS. 4 and 3, the floor panel 18 is disposed, on a lower surface thereof to face the ground, with a floor frame 52 extending along the vehicle front-rear direction. The floor frame 52 includes a first floor frame 54a disposed closer to the side sill 12 and a second floor frame 54b disposed closer to the floor tunnel 14.

The first floor frame 54a has a bent portion 64, of which a rear portion with respect to the floor cross member 16 is disposed linearly along the side sill 12, and of which a front portion with respect to the floor cross member 16 is bent inward in the vehicle width direction (see FIGS. 4 and 3). The second floor frame 54b is disposed linearly along the floor tunnel 14.

As shown in FIGS. 3 and 4, the first floor frame 54a and second floor frame 54b have intersections 58a and 58b intersecting with the floor cross member 16, respectively. The first floor frame 54a and second floor frame 54b are joined to the floor cross member 16 via the floor panel 18 at the intersections 58a and 58b, respectively. In addition, the widened portion 30 of the floor cross member 16 is configured to widen from a position (intersection 58a) to overlap (intersect) in the vehicle up-down direction with the first floor frame 54a toward an outer side (toward the side sill 12) in the vehicle width direction, in a planar view (see FIG. 3).

Further, at least a portion (such as the rear wall 28c) of the floor cross member 16 is disposed at a position to overlap in the vehicle front-rear direction (as viewed in the vehicle width direction) with the front end 50 provided at a lower end of the center pillar 48 (see FIG. 2).

Figure 6:
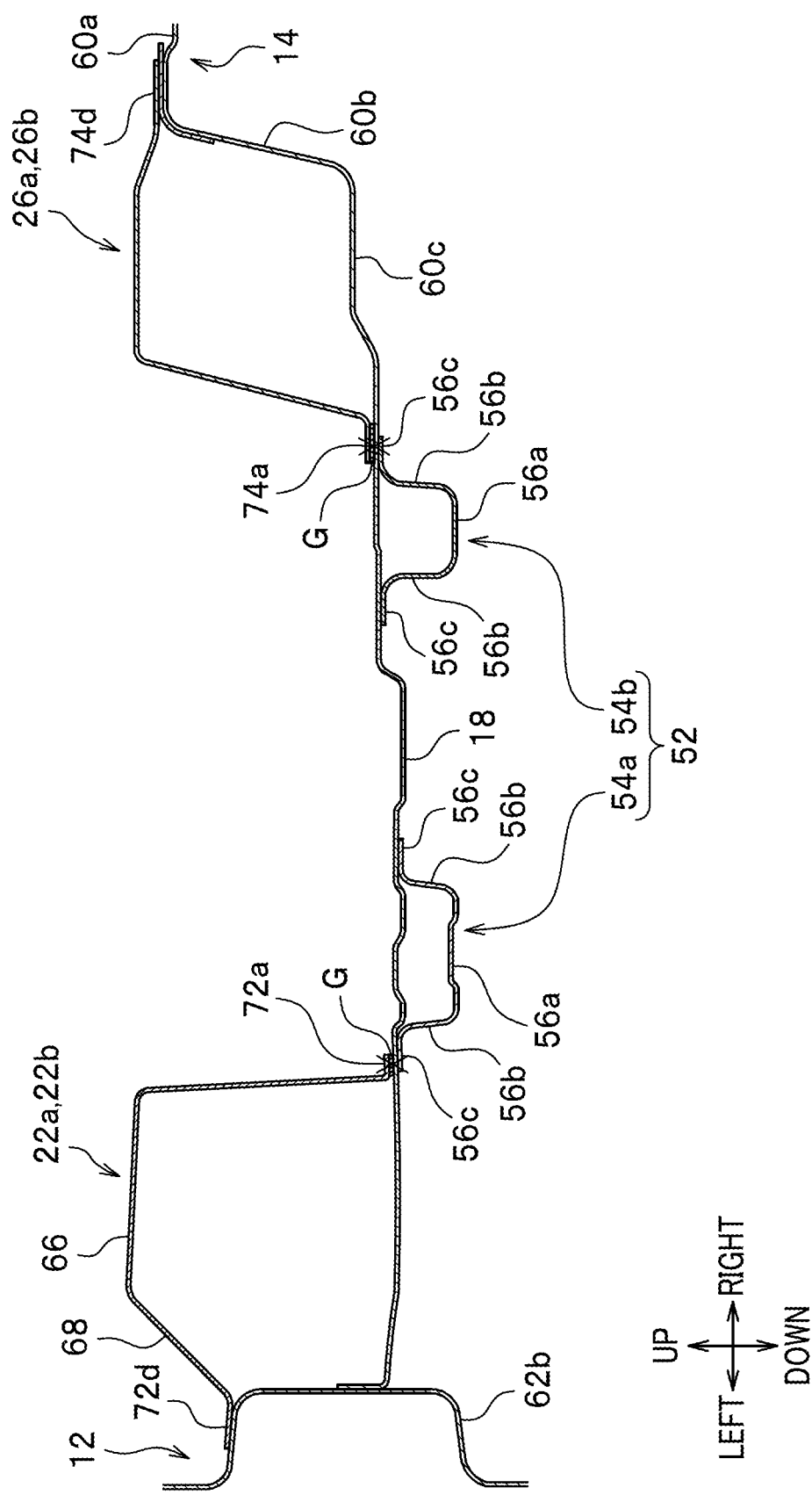
FIG. 6 is an end view of a first floor frame and a second floor frame.

As shown in FIG. 6, the floor frame 52 has a hat-shape in axial cross section, and has a lower wall 56a, a pair of side walls 56b continuing to the lower wall 56a and facing each other, and flanges 56c continuing to upper ends of the side walls 56b. The flanges (front flange 28d and rear flange 28e) of the floor cross member 16 and the flanges 56c of the floor frame 52 are welded and fixed to the upper surface and lower surface of the floor panel 18, respectively.

In other words, the floor panel 18 has the flanges (front flange 28*d* and rear flange 28*e*) of the floor cross member 16 joined to the upper surface thereof (see FIG. 2), and the flanges 56*c* of the floor frame 52 joined to the lower surface thereof (see FIG. 6). In this case, three members are overlapped in the up-down direction with each other and welded simultaneously and integrally at the intersections 58*a* and 58*b* at which the flanges (front flange 28*d* and rear flange 28*e*) of the floor cross member 16 vertically intersects the flanges 56*c* of the floor frame 52 (see joint points at the intersections 58*a* and 58*b* in FIG. 3).

Further, the first floor frame 54*a*, disposed closer to the side sill 12, is joined via the bent portion 64 to the first seat bracket 22*a* on a front side in the vehicle front-rear direction of the floor cross member 16 (see FIGS. 3 and 4).

As shown in FIG. 2, the first seat bracket 22*b* on a rear side of the floor cross member 16 is disposed at a position to overlap in the vehicle front-rear direction with the center pillar 48. The first seat bracket 22*a* on the front side of the floor cross member 16 is disposed on a front side in the vehicle front-rear direction of the center pillar 48.

At least a portion (such as an inner flange 72*a* to be described below) of each of the first seat brackets 22*a* and 22*b* is disposed to overlap with the first floor frame 54*a* in a planar view. At least a portion (such as an outer flange 74*a* to be described below) of each of the second seat brackets 26*a* and 26*b* is disposed to overlap with the second floor frame 54*b* in a planar view.

Figure 10:
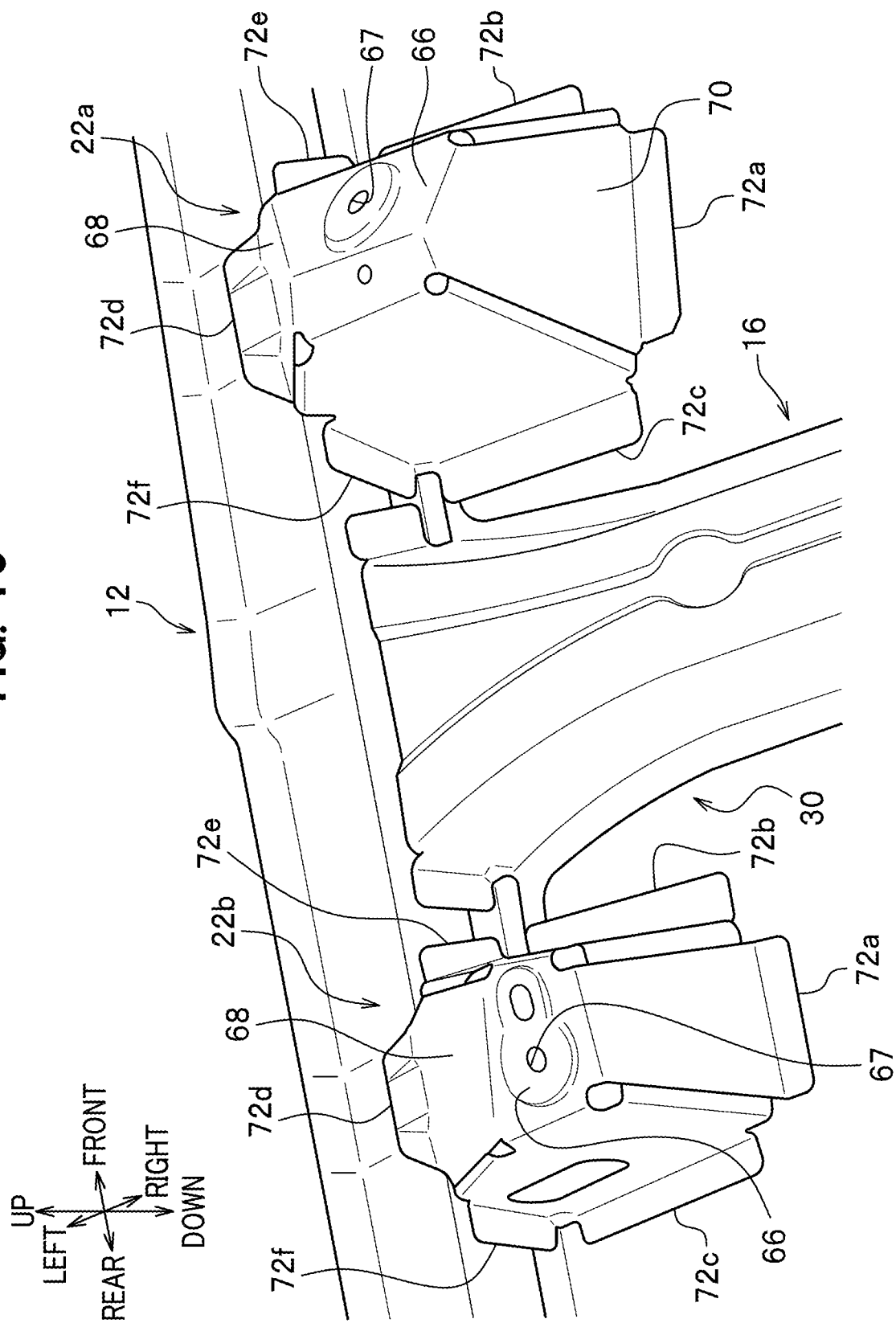
FIG. 10 is an enlarged perspective view of first seat brackets disposed closer to a side sill, as viewed from inside in the vehicle width direction.
Figure 11:
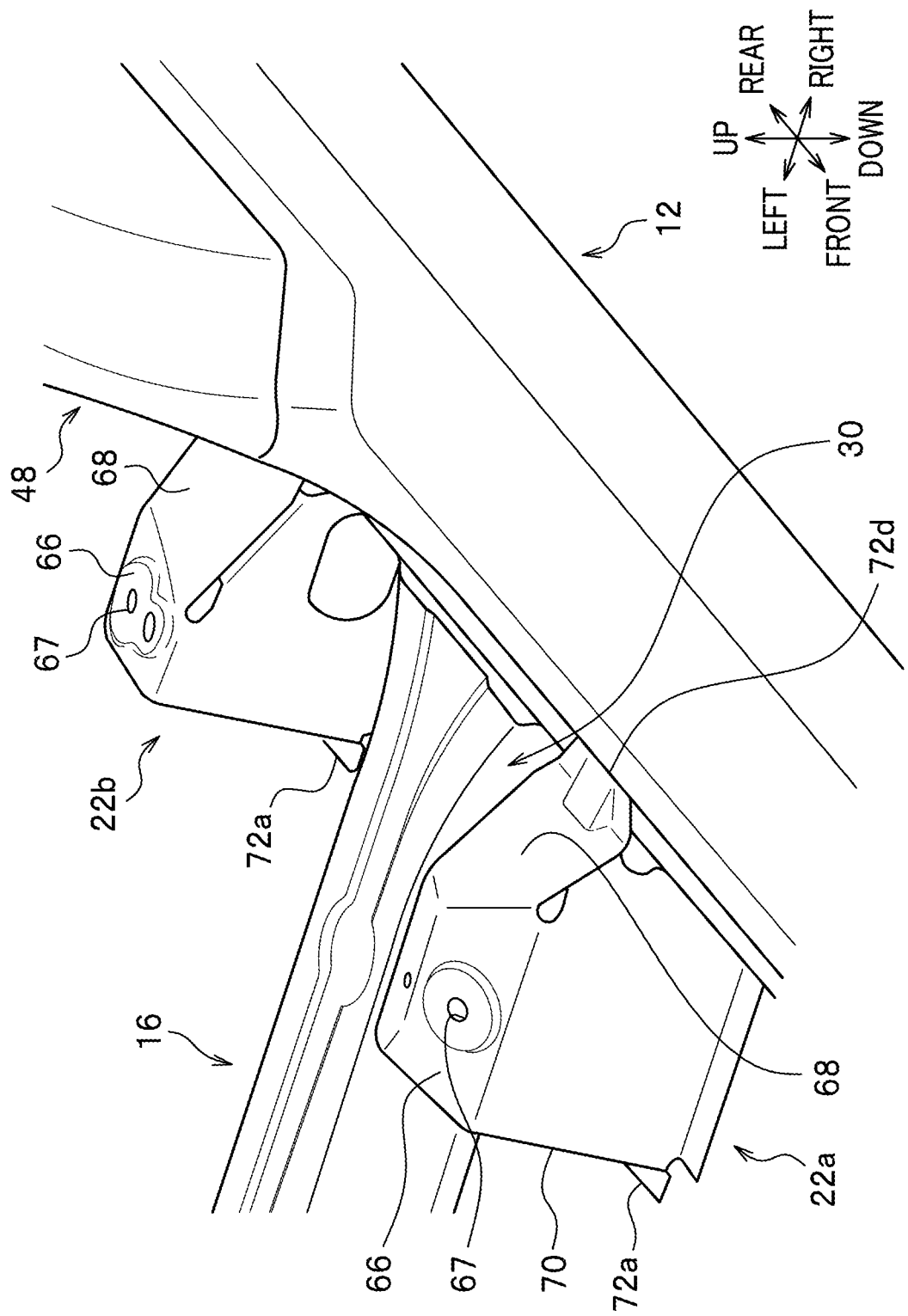
FIG. 11 is an enlarged perspective view of the first seat brackets disposed closer to the side sill, as viewed from outside in the vehicle width direction.

As shown in FIGS. 10 and 11, each seat bracket has a box-shape and supports a seat (not shown) from below. The seat bracket has, on a top surface thereof, a seat portion 66 on which the seat (not shown) is seated and attached with a bolt and a nut (not shown). The seat portion 66 has an attachment hole 67 for attaching the seat (not shown).

In addition, the first seat brackets 22*a* and 22*b*, closer to the side sill 12, each have an inclined portion 68 which is inclined downward from the seat portion 66 to an outer side in the vehicle width direction thereof, closer to the side sill 12 (see FIGS. 10 and 11). The second seat brackets 26*a* and 26*b*, closer to the floor tunnel 14, each have the inclined portion 68 which is inclined downward from the seat portion 66 to an inner side in the vehicle width direction toward the floor tunnel 14 (see FIG. 1)

Further, the first seat bracket 22*a*, disposed closer to the side sill 12 on the front side, has an inner wall 70 on an inner side in the vehicle width direction thereof (see FIG. 10), and the inner wall 70 extends along the flange 56*c* on the outer side in the vehicle front-rear direction of the first floor frame 54*a*. In other words, the first floor frame 54*a* has the bent portion 64, bent inward in the vehicle width direction, provided on a front side of the floor cross member 16, and the inner wall 70 of the first seat bracket 22*a* on the front side is inclined inward in the vehicle width direction along the bent portion 64 in a planar view (see FIG. 3).

As shown in FIGS. 10 and 11, the first seat brackets 22*a* and 22*b* closer to the side sill 12 each have an inner flange 72*a* on the inner side in the vehicle width direction thereof, a front flange 72*b* on the front side in the vehicle front-rear direction thereof, a rear flange 72*c* on the rear side in the vehicle front-rear direction thereof, and an outer flange on the outer side in the vehicle width direction thereof and joined to the side sill 12, respectively. The outer flange includes a first outer flange 72*d* joined to an upper wall of the side sill 12, a second outer flange 72*e* joined to a front side wall of the side sill 12, and a third outer flange 72*f* joined to a rear side wall of the side sill 12.

The inner flanges 72*a* of the first seat brackets 22*a* and 22*b* are disposed at positions to overlap with the flange 56*c* on the outer side of the first floor frame 54*a* in a transparent planar view (see FIG. 3). The inner flanges 72*a* of the first seat brackets 22*a* and 22*b* are integrally joined to the flange 56*c* of the first floor frame 54*a* via the floor panel 18. That is, the first seat brackets 22*a* and 22*b* and the first floor frame 54*a* are joined (coupled) with each other via the floor panel 18 at the bent portion 64 of the first floor frame 54*a*.

Further, as shown in FIGS. 3 and 1, the second seat brackets 26*a* and 26*b*, closer to the floor tunnel 14, each have an outer flange 74*a* on the outer side in the vehicle width direction thereof, a front flange 74*b* on the front side in the vehicle front-rear direction thereof, a rear flange 74*c* on the rear side in the vehicle front-rear direction thereof, a first inner flange 74*d* on the inner side in the vehicle width direction thereof and joined to an upper wall of the floor tunnel 14, a second inner flange 74*e* (only in the first seat bracket 26*a*) joined to a front side wall of the floor tunnel 14, and a third inner flange 74*f* (only in the first seat bracket 26*b*) joined to a rear side wall of the floor tunnel 14. The outer flanges 74*a* of the second seat brackets 26*a* and 26*b* are disposed at positions to overlap with the flange 56*c* on the inner side of the second floor frame 54*b* in a transparent planar view (see FIG. 3). The outer flanges 74*a* of the second seat brackets 26*a* and 26*b* are integrally joined to the flange 56*c* on the inner side of the second floor frame 54*b* via the floor panel 18.

Still further, as shown in FIG. 6, the floor panel 18 has the inner flanges 72*a* (outer flanges 74*a*) of the first seat brackets 22*a* and 22*b* (second seat brackets 26*a* and 26*b*) joined to the upper surface thereof, and the flanges 56*c* of the floor frame 52 (54*a* and 54*b*) joined to the lower surface thereof. In this case, the three members of the seat bracket (22*a*, 22*b*, 26*a*, and 26*b*), the floor panel 18, and the floor frame 52 are overlapped in the up-down direction with each other and spot welded simultaneously and integrally. Note that glue G is applied to a welded region between the inner flange 72*a* (outer flange 74*a*) and the upper surface of the floor panel 18 (see FIG. 6).

The side sill 12 has an outer side sill 62*a* (see FIG. 1) disposed on the outer side in the vehicle width direction and the inner side sill 62*b* (see FIG. 9) disposed on the inner side in the vehicle width direction. In a cross section taken along the axial direction of the side sill 12, a reinforcing member which reinforces the side sill 12 cross-sectionally is provided between the outer side sill 62*a* and the inner side sill 62*b*.

The vehicle 10 applied with the lower vehicle-body structure of the present embodiment is basically formed as described above, and advantageous effects thereof are described below.

The present embodiment includes: the floor cross member 16 coupling the side sill 12 disposed on the outer side in the vehicle width direction of the vehicle body to the floor tunnel 14 disposed in the center in the vehicle width direction of the vehicle body, the seat brackets (first seat brackets 22*a* and 22*b*, and second seat brackets 26*a* and 26*b*) disposed to have the floor cross member 16 therebetween in the vehicle front-rear direction at both ends in the vehicle width direction of the floor cross member 16 and coupled to the side sill 12 and the floor tunnel 14, respectively, and the floor frame 52 extending in the vehicle front-rear direction and disposed on the floor panel 18. At least portions of the seat brackets (inner flanges 72*a* of the first seat brackets 22*a* and 22*b*, and outer flanges 74*a* of the second seat brackets 26*a* and 26b, for example) are disposed at positions to overlap with the floor frame 52 in a planar view.

In the present embodiment, at least a portion of the seat bracket is disposed at a position to overlap with the floor frame 52 in a planar view, so that a load (seat load) inputted from a seat (not shown), is suitably supported by the floor frame 52. In addition, in the present embodiment, a side collision load inputted from the side sill 12, the center pillar 48, or the like, is supported (absorbed) by the seat brackets, so that addition of other cross members or reinforcement by reinforcing members is not necessary, for example, to allow for securing wide legroom for occupants. As a result, the present invention reduces a lower vehicle-body in weight and improves rigidity of the lower vehicle-body.

Further, in the present embodiment, the floor frame 52 is disposed on the lower surface of the floor panel 18 and has the intersections 58a and 58b intersecting with the floor cross member 16. The floor frame 52 is joined (coupled) at the intersections 58a and 58b to the floor cross member 16 via the floor panel 18.

The present embodiment has the floor frame 52 joined to the floor cross member 16 at the intersections 58a and 58b intersecting with the floor cross member 16, to allow for transmitting a seat load to the floor cross member 16 via the floor frame 52, to support the seat load more efficiently. In addition, the present embodiment allows an inputted side collision load to be transmitted to the floor cross member 16, and further allows the transmitted side collision load to be supported (absorbed) by the seat brackets. As a result, the present embodiment does not require addition of other cross members or reinforcement with reinforcing members, for example, to allow for securing wide legroom for occupants.

Further, in the present embodiment, the floor frame 52 is configured to include the first floor frame 54a disposed closer to the side sill 12 and the second floor frame 54b disposed closer to the floor tunnel 14. The seat brackets include the first seat brackets 22a and 22b coupled to the side sill 12, and the second seat brackets 26a and 26b coupled to the floor tunnel 14. The first seat brackets 22a and 22b are disposed at positions to overlap with the first floor frame 54a in a planar view. The second seat brackets 26a and 26b are disposed at positions to overlap with the second floor frame 54b in a planar view. The first floor frame 54a and second floor frame 54b are provided to intersect with the floor cross member 16 at the intersections 58a and 58b, respectively.

The present embodiment has a plurality of the floor frames 52 including the first floor frame 54a and second floor frame 54b, with the floor frames 52 coupled to the first seat brackets 22a and 22b, and the second seat brackets 26a and 26b, respectively. This allows for transmitting a seat load to the floor cross members 16 via the floor frames 52, to efficiently support a seat load. In addition, the present embodiment allows an inputted side collision load to be transmitted to the floor cross members 16, and further allows the transmitted side collision load to be supported (absorbed) by the seat brackets. As a result, the present embodiment does not require addition of other cross members or reinforcement with reinforcing members, for example, to allow for securing wide legroom for occupants.

Furthermore, in the present embodiment, the first floor frame 54a has the bent portion 64 which is bent inward in the vehicle width direction on the front side of the floor cross member 16. The first seat bracket 22a on the front side is joined (coupled) to the bent portion 64.

In the present embodiment, the first seat bracket 22a disposed closer to the side sill 12 and on the front side of the floor cross member 16 is joined to the bent portion 64 of the first floor frame 54a, to allow a load (including a seat load, a side collision load, and an offset side collision load) inputted to the first seat bracket 22a to be efficiently transmitted to the first floor frame 54a via the bent portion 64. Accordingly, seat support rigidity is improved by the present embodiment. In addition, the inputted side collision load and the like are transmitted to the first floor frame 54a and supported (absorbed) by the first seat bracket 22a. As a result, the present embodiment does not require addition of other cross members or reinforcement, to allow for securing wide legroom for occupants.

Furthermore, in the present embodiment, the floor frame 52 (first floor frame 54a and second floor frame 54b) has the flanges 56c to be joined (coupled) to the floor panel 18. The seat brackets (first seat brackets 22a and 22b, and second seat brackets 26a and 26b) are disposed at positions to overlap with the flanges 56c in a planar view and are joined (coupled) to the flanges 56c via the floor panel 18.

In the present embodiment, the seat bracket is joined to the flange 56c of the floor frame 52, so that an inputted seat load is efficiently transmitted to the floor cross member 16 via the floor frame 52. Accordingly, the present embodiment improves seat support rigidity.

Further, the present embodiment is configured to include the center pillar (pillar) 48 extending upward from the side sill 12. One first seat bracket 22b on the rear side of the floor cross member 16 is disposed at a position to overlap in the vehicle front-rear direction with the center pillar 48, as viewed from outside in the vehicle width direction. The other first seat bracket 22a on the front side of the floor cross member 16 is disposed on the front side of the center pillar 48, as viewed from outside in the vehicle width direction.

In the present embodiment, the one first seat bracket 22b on the rear side is disposed at a position to overlap in the vehicle front-rear direction with the center pillar 48, so that a seat load is supported (absorbed) by the side sill 12 and the center pillar 48. Further, the other first seat bracket 22a on the front side is disposed on the front side of the center pillar 48, so that an offset side collision load inputted via the center pillar 48 and one of the floor cross members 16 on the right and left sides from a position offset in the vehicle front-rear direction is suitably transmitted to the other of said floor cross members 16 via the first seat bracket 22a on the front side.

Further, in the present embodiment, at least a portion of the floor cross member 16 is disposed at a position to overlap in the vehicle front-rear direction with the front end 50 of the center pillar 48, so that a side collision load inputted from the center pillar 48 and an offset side collision load inputted from a front side of the center pillar 48 are efficiently transmitted to the floor cross member 16.

Moreover, the present embodiment has the inner wall 70, on the inner side in the vehicle width direction of the first seat bracket 22a on the front side, extending along the flange 56c on the outer side of the first floor frame 54a, in the vehicle front-rear direction (bending direction of the bent portion 64), to allow a seat load to be efficiently transmitted to the floor cross member 16 via the floor frame 52 so that seat support rigidity is improved.

Further, in the present embodiment, the seat brackets (first seat bracket 22a and second seat bracket 22b) each have the seat portion 66 on which an attached seat (not shown) is seated, and the inclined portion 68 inclined downward from the seat portion 66. The seat portion 66 is joined (coupled) to the side sill 12 and the floor tunnel 14 via the inclined portion 68, respectively.

In the present embodiment, the seat portions 66 of the seat brackets are joined to the side sill 12 and floor tunnel 14 via the inclined portions 68, so that a seat load is dispersed to the side sill 12 and floor tunnel 14, to improve seat support rigidity.

What is claimed is:

1. A lower vehicle-body structure comprising:
   a floor cross member coupling a side sill disposed on an outer side in a vehicle width direction of a vehicle body to a floor tunnel disposed in a center in the vehicle width direction of the vehicle body;
   seat brackets disposed to have the floor cross member therebetween in a vehicle front-rear direction at both ends in the vehicle width direction of the floor cross member, and coupled to the side sill and the floor tunnel, respectively; and
   a floor frame extending in the vehicle front-rear direction and disposed on a floor panel, wherein
   at least portions of the seat brackets are disposed at positions to overlap with the floor frame in a planar view.

2. The lower vehicle-body structure according to claim 1, wherein
   the floor frame is disposed on a lower surface of the floor panel and has intersections intersecting with the floor cross member, and
   the floor frame is coupled at the intersections to the floor cross member via the floor panel.

3. The lower vehicle-body structure according to claim 2, wherein
   the floor frame includes a first floor frame disposed closer to the side sill and a second floor frame disposed closer to the floor tunnel,
   the seat brackets include first seat brackets coupled to the side sill and second seat brackets coupled to the floor tunnel,
   the first seat brackets are disposed at positions to overlap with the first floor frame in a planar view,
   the second seat brackets are disposed at positions to overlap with the second floor frame in a planar view, and
   the first floor frame and the second floor frame intersect with the floor cross member at the intersections, respectively.

4. The lower vehicle-body structure according to claim 3, wherein
   the first floor frame has a bent portion which is bent inward in the vehicle width direction on a front side of the floor cross member, and
   the first seat bracket is coupled to the bent portion.

5. The lower vehicle-body structure according to claim 2, wherein
   the floor frame has flanges to be coupled to the floor panel, and
   the seat brackets are disposed at positions to overlap with the flanges in a planar view and are coupled the flanges via the floor panel.

6. The lower vehicle-body structure according to claim 3, further comprising a pillar extending upward from the side sill, wherein
   the first seat bracket on a rear side of the floor cross member is disposed at a position to overlap in the vehicle front-rear direction with the pillar, and
   the first seat bracket on a front side of the floor cross member, is disposed on a front side of the pillar.

7. The lower vehicle-body structure according to claim 2, further comprising a pillar extending upward from the side sill, wherein
   at least a portion of the floor cross member is disposed at a position to overlap in the vehicle front-rear direction with a front end in the vehicle front-rear direction of the pillar.

8. The lower vehicle-body structure according to claim 5, wherein an inner wall, on an inner side in the vehicle width direction of the seat bracket, extends along a flange of the floor frame, in the vehicle front-rear direction.

9. The lower vehicle-body structure according to claim 2, wherein
   the seat brackets each have a seat portion on which an attached seat is seated, and an inclined portion inclined downward from the seat portion, and
   the seat portions are coupled to the side sill and the floor tunnel via the inclined portions, respectively.

* * * * *